US011222135B2

(12) United States Patent
Tripp et al.

(10) Patent No.: US 11,222,135 B2
(45) Date of Patent: Jan. 11, 2022

(54) USER DEVICE PRIVACY PROTECTION

(71) Applicant: INTERNATIONAL BUSINESS MACHINES CORPORATION, Armonk, NY (US)

(72) Inventors: Omer Tripp, Bronx, NY (US); Julian Timothy Dolby, Bronx, NY (US); Marco Pistoia, Amawalk, NY (US); Pietro Ferrara, Westchester, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 306 days.

(21) Appl. No.: 15/990,783

(22) Filed: May 28, 2018

(65) Prior Publication Data
US 2019/0362095 A1   Nov. 28, 2019

(51) Int. Cl.
G06F 21/62    (2013.01)
(52) U.S. Cl.
CPC ................ G06F 21/6245 (2013.01)
(58) Field of Classification Search
CPC ...... G06F 21/6245; G06F 8/61; G06F 63/102; G06F 63/20
See application file for complete search history.

(56) References Cited

U.S. PATENT DOCUMENTS

| 8,452,693 | B2 | 5/2013 | Shah et al. |
| 8,646,032 | B2 | 2/2014 | Aad et al. |
| 8,844,036 | B2 | 9/2014 | Saidi et al. |
| 8,886,217 | B2 | 11/2014 | Reitter et al. |
| 9,203,867 | B1 | 12/2015 | Ahn |
| 9,338,188 | B1 | 5/2016 | Ahn |
| 2002/0172363 | A1* | 11/2002 | Dierks ............ G06F 21/85 380/259 |
| 2006/0120526 | A1* | 6/2006 | Boucher .......... H04L 63/12 380/247 |
| 2007/0226797 | A1* | 9/2007 | Thompson ...... H04L 63/1416 726/22 |

(Continued)

OTHER PUBLICATIONS

Artz, S. et al., "FlowDroid: Precise Context, Flow, Field, Object-sensitive and Lifecycle-aware Taint Analysis for Android Apps"; ACM (2014); 11pgs.

(Continued)

Primary Examiner — Tongoc Tran
(74) Attorney, Agent, or Firm — Intelletek Law Group, PLLC; Gabriel Daniel, Esq.

(57) ABSTRACT

A method and system of protecting user sensitive information from an application program of a user device are provided. The application program to be installed is received on the user device. Permissions to resources of the user device for the application program are identified. For each permission, mapping the permission to one or more sections of a code of the application program. For each mapped section of the code, a recipient of user sensitive information facilitated by the permission is determined. For each recipient, it is determined whether the recipient should be restricted. Upon determining that the recipient should not be restricted, the user sensitive information facilitated by the permission is provided to the recipient. However, upon determining that the recipient should be restricted, alternate information to the recipient.

18 Claims, 6 Drawing Sheets

(56) References Cited

U.S. PATENT DOCUMENTS

| | | | |
|---|---|---|---|
| 2009/0049550 A1* | 2/2009 | Shevchenko | G06F 21/52 726/23 |
| 2009/0070734 A1* | 3/2009 | Dixon | G06F 8/71 717/102 |
| 2010/0125891 A1* | 5/2010 | Baskaran | H04L 9/3263 726/1 |
| 2010/0281540 A1* | 11/2010 | Aime | G06F 21/563 726/23 |
| 2011/0283269 A1* | 11/2011 | Gass | G06F 8/65 717/168 |
| 2012/0246731 A1* | 9/2012 | Blaisdell | G06F 21/54 726/26 |
| 2012/0304310 A1* | 11/2012 | Blaisdell | G06F 21/52 726/28 |
| 2014/0059695 A1 | 2/2014 | Parecki et al. | |
| 2014/0157351 A1 | 6/2014 | Canning et al. | |
| 2015/0207820 A1 | 7/2015 | Klug et al. | |
| 2015/0222641 A1 | 8/2015 | Lu et al. | |
| 2016/0034711 A1 | 2/2016 | Poomachandran et al. | |
| 2016/0134660 A1 | 5/2016 | Ponsini et al. | |
| 2017/0169224 A1* | 6/2017 | Park | G06F 21/566 |
| 2017/0287036 A1* | 10/2017 | Barday | G06Q 30/0609 |
| 2017/0353481 A1* | 12/2017 | Kong | H04L 63/145 |
| 2019/0166148 A1* | 5/2019 | Eskandari | H04L 63/1433 |

OTHER PUBLICATIONS

Nan, Y. et al., "UIPicker: User-Input Privacy Identification in Mobile Applications"; USENIX Association (2015); pp. 992-1008.

Rastogi, V. et al., "AppsPlayground: Automatic Security Analysis of Smartphone Applications"; ACM (2013); 12 pgs.

Tripp, O. et al., "Application- and User-Sensitive Privacy Enforcement in Mobile Systems"; MOBILESoft'15 IEEE/ACM 2nd Inter. Conf. on, May 16-17, 2015, pp. 162-163.

Anonymous, "Xposed Module Repository"; http://repo.xposed.info/module/eu.faircode.xlua (2013); 2 pgs.

* cited by examiner

300

| Resource | Destination/ Purpose | Restrict | Alternative |
|---|---|---|---|
| GPS | Weather Server (To Provide Local Weather) | ☐ Check | |
| GPS | Marketing Server (Marketing) | ☑ Check | |
| GPS | Traffic Server (Traffic/speed) | ☑ Check | 25MPH |
| Camera | Photo Repository (Unknown) | ☑ Check | Pic 207 |

FIG. 3

USER DEVICE PRIVACY PROTECTION

BACKGROUND

Technical Field

The present disclosure generally relates to security tools, and more particularly, to tools that protect user private information.

Description of the Related Art

Compact, feature specific software applications, commonly referred to as "apps," have become ubiquitous on a wide array of computing devices, including smart phones, tablets, and other devices, collectively referred to herein as user devices (UD's). With the ever-increasing number of available applications on different platforms, they can represent a significant security risk when stored on a computing device. Given the open nature of some application platforms, applications may come from a wide variety of sources and may not be rigorously tested for vulnerabilities, including dissemination of user sensitive information.

SUMMARY

According to various exemplary embodiments, a computing device, a non-transitory computer readable storage medium, and a method are provided to protect user sensitive information from an application program of a user device. The application program to be installed is received on the user device. Permissions to resources of the user device for the application program are identified. For each permission, mapping the permission to one or more sections of a code of the application program. For each mapped section of the code, a recipient of user sensitive information facilitated by the permission is determined. For each recipient, it is determined whether the recipient should be restricted. Upon determining that the recipient should not be restricted, the user sensitive information facilitated by the permission is provided to the recipient. Upon determining that the recipient should be restricted, alternate information to the recipient.

In various embodiments, the alternate information is randomly generated, received from a user interface of the user device or retrieved from a repository over a network.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 is an example dialogue box, which can be displayed on a user interface of the user device, consistent with an illustrative embodiment.

DETAILED DESCRIPTION

Overview

Figure 1:
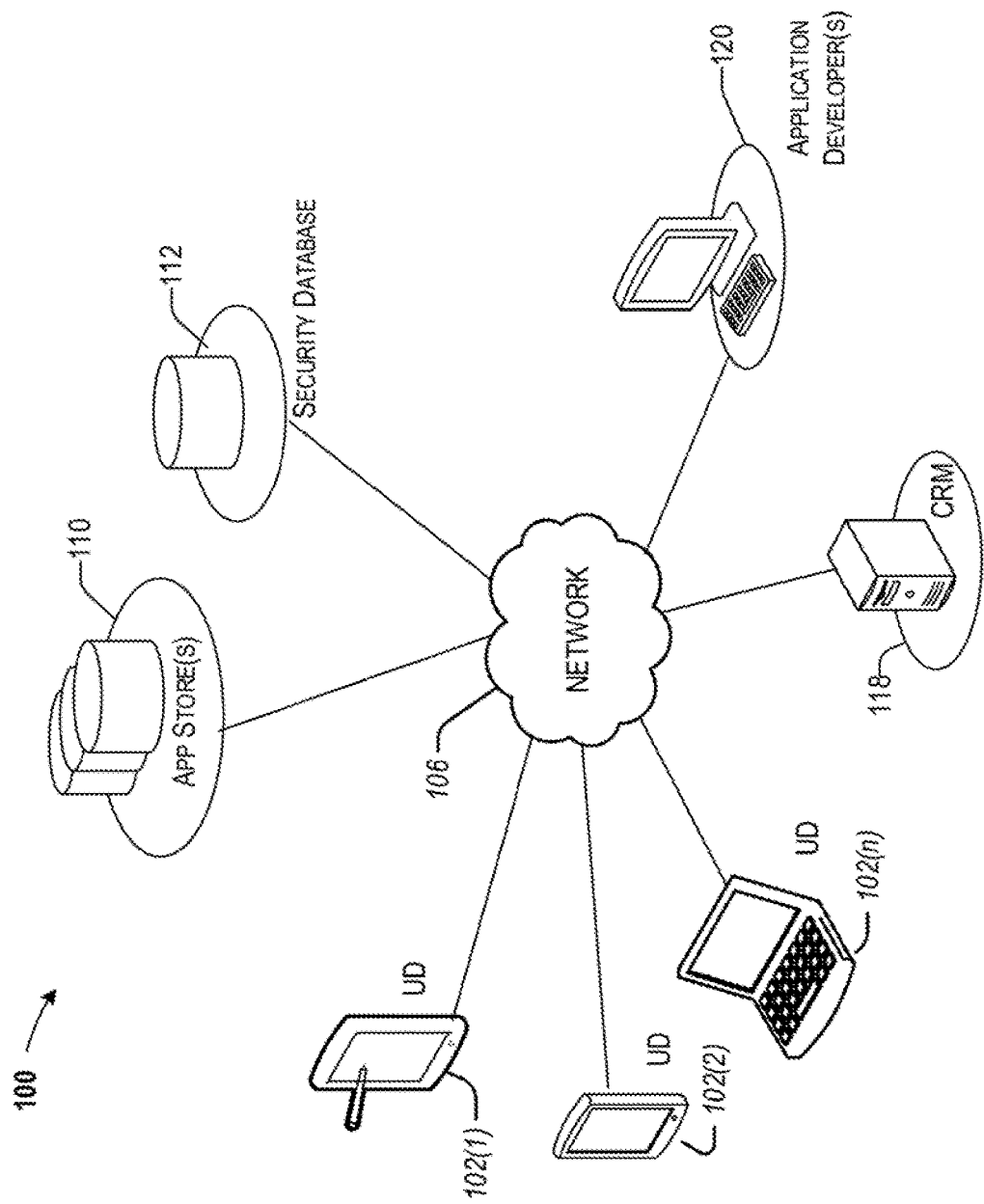
FIG. 1 is an example architecture for implementing a system that prevents user sensitive information to be disclosed by vulnerable applications, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to security tools, and more particularly, to tools that identify apps that are vulnerable to disclose user sensitive information. Indeed, one of the main threats posed by malicious or poorly written applications are privacy violations that leak sensitive information, such as location information, contact data, SMS messages, pictures, etc., to an attacker or a third party, collectively referred to herein as a malicious party. Applications for mobile devices, sometimes referred to herein as apps, have access to different categories of private information, including unique device identification (e.g., International Mobile Equipment Identity (IMEI), email address, IP address, etc.), geographic location, calendar events and contacts, accelerometer information, speed of travel, etc. Furthermore, applications often receive as input security-sensitive information, including user IDs and passwords, as well as credit-card social-security and bank-account numbers. The foregoing private information is collectively referred to herein as user sensitive information. This user sensitive information may be used to identify a user for targeted advertisement or more nefarious activity.

The two major platforms for mobile devices, Android and iOS, both mediate access to private information via a permission model. Permissions govern access to designated resources, such as the contact list or GPS system. In Android, permissions are managed at install time, whereas in iOS a permission is granted or revoked upon first access to the respective resource. In both cases, permissions apply globally across all contexts and usage scenarios. For example, usage of the user's location for navigation cannot be distinguished from its usage for contextual advertising.

What exacerbates the situation is that a user may not be given a choice of which permissions to be not granted. For example, the android platform typically does not allow a user to control what permission(s) to forbid during installation. Android apps can declare as many permissions as the developer desires. Often, users can only view the permission details but can't deny them to warrant successful installation of the app. Furthermore, some developers lack the sense of privacy, or there may not be reasonable alternatives for an app, which may facilitate abuse of permissions. User sensitive information is often part of the business model of the app.

Accordingly, what is provided herein is a way to not only identify permissions to resources of a user device but also an effective way of restricting the requested permissions. Even if apps are designed in a way to prevent functionality (e.g., avoid operation or simply crash) if a null or invalid value is returned, the teachings herein generally prevent such scenarios by replacing user sensitive information with alternate user information.

The techniques described herein may be implemented in a number of ways. Example implementations are provided below with reference to the following figures.

Example Architecture

FIG. 1 illustrates an example architecture 100 for implementing a system that prevents user sensitive information to be disclosed by vulnerable applications. Architecture 100 includes a network 106 that allows various user devices 102(1) to 102(n) to communicate with each other, as well as other components that are connected to the network 106, such as one or more software application store(s) 110 and security database(s) 112. There may be a customer relations management (CRM) server 118 that provides information related to these security services and other user account information.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, which provides various ancillary services, such as communication with various application stores, databases, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows users of the user devices 102(1) to 102(n) to communicate with each other and to be able to receive applications from one or more app stores 110. The app store(s) 110 may receive their content and updates thereof from various application developers represented collectively herein by application developer(s) 120. The application developer(s) 120 often have the flexibility of requesting permissions to various resources of a user device that may be deemed as user sensitive information.

For purposes of later discussion, several user devices appear in the drawing, to represent some examples of the devices that may receive various services via the network 106. Today, user device's typically take the form of portable handsets, smart-phones, tablet computers, personal digital assistants (PDAs), smart watches, and laptops, although they may be implemented in other form factors, including consumer, and business electronic devices.

A user device (e.g., 102(1)) may have various applications stored in its memory that may have been downloaded from various application stores, represented herein by application store(s) 110. The application store(s) 110 may provide applications and updates thereof to user device's over the network 106. These applications may include multi-tier applications that interact with servers, libraries, and databases, such as security database 112 for content.

Each computing device that is subscribed to the security services described herein, includes an application, sometimes referred to herein as the privacy engine, that is operative to protect the user sensitive information of the corresponding user device, based on the preferences of the user. The privacy engine is discussed in more detail below.

In addition to the privacy engine, each computing device has one or more applications stored in its memory. These applications may come from various sources, such as application store(s) 110 or even directly from application developers 120. The permissions requested by each of these applications may relate to various information that may be deemed sensitive information by the user. For example, the application may request access to information related to various sensors of the user device, such as sound recorded by the microphone, accelerometer information (which may indicate an accident), location information (to determine the exact location of the user device and/or speed thereof), internet traffic, cookie information, camera information, humidity, barometer, battery status (e.g., power level), IP address, hardware configuration, and other sensor information of the user device, which are regarded as resources of the user device.

As discussed above, a user may download an app and provide general permissions to various resources requested by the app. For example, a calculator app may request permission to access the GPS, camera, or other user sensitive information, that may not be relevant to the calculator app. Even if an app makes a reasonable request for user sensitive information, such as GPS information for a weather app, a user may not immediately understand whether this information is used for other purposes as well, such as location tracking and/or targeted advertising.

In various embodiments, the privacy engine herein can analyze the app (i.e., code thereof) upon download to the user device both dynamically and statically. Dynamic program analysis may involve test runs to reach appropriate code coverage. In some situations, the app may be sophisticated enough to recognize a dynamic analysis thereof, to provide a deliberate false negative. Thus, while dynamic program analysis may be generally effective and have more precision, some malicious applications may nonetheless provide a false negative. In this regard, applicants have identified that a static analysis, while not necessarily having the same precision of dynamic analysis, is more sensitive to potential security threats caused by unintended use of user sensitive information. Stated differently, static analysis by the privacy engine is less likely to lead to false negatives. In one embodiment, dynamic analysis is performed in addition to static analysis.

Figure 2:
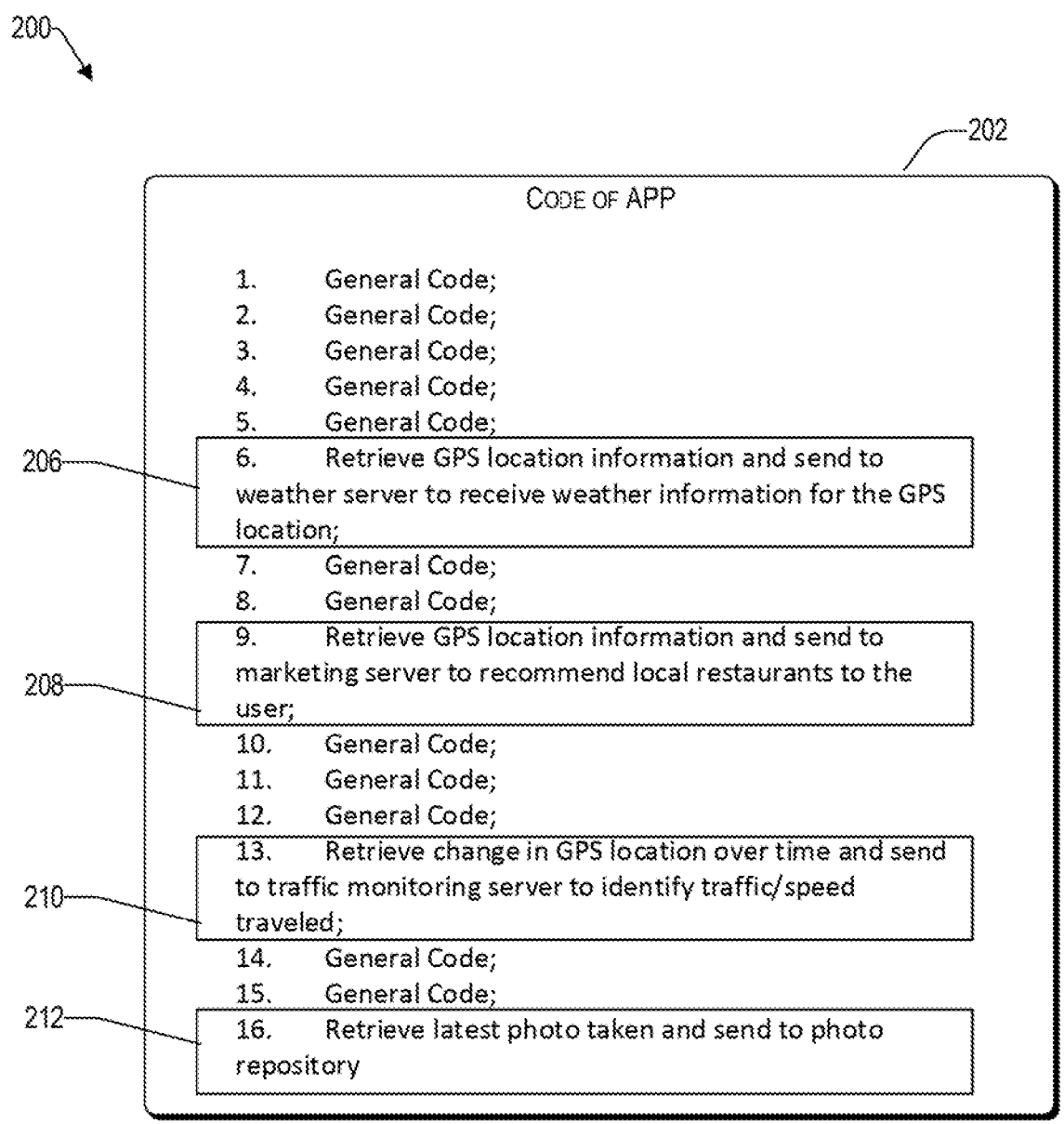
FIG. 2 illustrates an example static analysis of the code of an application.

Reference now is made to FIG. 2, which illustrates an example static analysis of the code 200 of an app. The analysis of the code 200 is explained in view of the architecture of FIG. 1. For example, the privacy engine on a user device (e.g., 102(1)) may receive an app from the app store 110 over the network 106. The app may request permission to various resources of the user device, which may disclose user sensitive information. For example, the received application may be a weather app that is requesting access to the GPS to determine location information to provide appropriate weather information. Upon installation, the privacy engine on the user device (e.g., 102(1)) determines all the permission requests of the installed app (i.e., weather app in this example).

Each determined permission request is mapped to one or more sections in the code of the app. For example, the first permission request (i.e., GPS) is mapped to sections 206

(i.e., line 6), 208 (i.e., line 9), and 210 (i.e., line 13) of the code 202. The second permission request is mapped to section 212 (i.e., line 16) of the code 202. For each mapped section of the code, a recipient is determined. For example, for section 206, the recipient of the user sensitive information (i.e., GPS location) is a weather server that is configured to provide weather information based on the GPS location received. However, in section 208, the recipient of the GPS location is a marketing server that is configured to recommend local restaurants to the user, which may be beyond the scope of what the user intended with their grant of permission.

In section 210, the GPS location is used to determine a speed of the user device, which is sent to a traffic monitoring server configured to identify the traffic in that location and/or speed traveled. Still further, with respect to the second permission, section 212 retrieves a photo taken by the user and sends it to a photo repository.

In one embodiment, for each permission to access information from a resource of the user device, the user is prompted for a confirmation of the permission, for each particular recipient. In this regard, reference is made to FIG. 3, which is an example dialogue box 300 that can be displayed on a user interface of the user device. For each resource 302, a corresponding destination and/or purpose 304 is provided. The user can then choose which permissions to restrict 306. Thus, even though the application may require permissions to be granted for installation and/or proper operation, the privacy engine can still provide an addition layer of privacy that is tailored to the user for the subject application.

Applicants have determined that some apps may require user sensitive information for proper operation. For example, applications may not continue to operate or simply crash if access to user sensitive information is restricted therefrom. In this regard, the privacy engine is configured to provide alternate information that does not compromise the user sensitive information. For example, upon determining that a resource 302 for a destination/purpose 304 is restricted 306, then a default or random value may be provided. In one embodiment, the user may provide alternative information 308. For example, the user can specify the default speed to be provided to the traffic server to be 25 MPH. Similarly, an alternative default photo 312 may be one selected by the user.

In one embodiment, if none of the permissions related to resources 302 have a corresponding section in the code of the app 202, then the destination/purpose field 304 is left blank, which indicates to the user that although permission to the resource has been requested, it presently has no purpose. Such scenario may occur when an app is in its initial stage but evolves over time to add additional features. In this regard, it is noted that, in one embodiment, the analysis of the privacy engine is performed not only during an installation of an app, but also during every update thereof. By virtue of the privacy engine performing the analysis of the app with respect to the user device, the protection offered by the privacy engine becomes tailored for the particular hardware configuration of the user device and the user preferences.

Returning to FIG. 1, in one embodiment, the purpose of each request for permission for a resource, for each mapped section of the code, the privacy engine determines the purpose of the app, from the security database 112. For example, the security database 112 may be maintained by a security software company or a consortium of organizations and/or individuals interested in software security to provide an up-to-date resource for identifiable software libraries and or linked servers that represent potential security risk. Accordingly, the security database 112 may provide an explanation as to the nature and purpose of a destination for the sensitive information harvested from a resource of the user device.

In one embodiment, the Customer Relationship Manager (CRM) server 118 offers its account holders (e.g., subscribers of the application security service) on-line access to a variety of information related to the user's account, such as on-line payment information, subscription changes, preferences (such as default GPS locations, default speeds, pictures, etc.), and the like.

Figure 4:
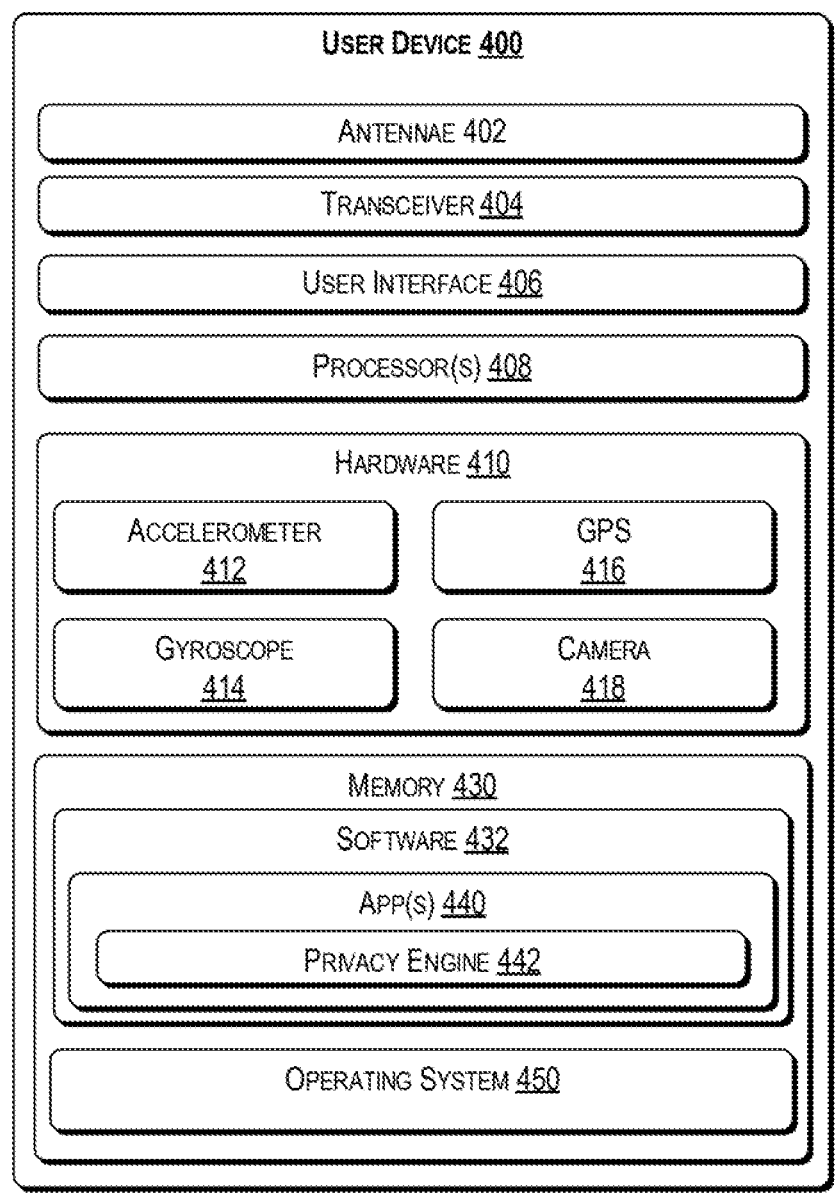
FIG. 4 is a block diagram showing various components of a user device at a high level, consistent with an illustrative embodiment.

While the app store(s) 110, the security database 112, and the CRM 118 have been illustrated by way of example to be on different platforms, it will be understood that in various embodiments, their functionality described herein can be combined. In other embodiments, these computing platforms may be implemented by virtual computing devices in the form of virtual machines or software containers that are hosted in a cloud, thereby providing an elastic architecture for processing and storage Example User Device As discussed in the context of FIG. 1, the identification of whether an app is vulnerable to disclose user sensitive information and protection thereof, involve different types of user devices. To that end, FIG. 4 illustrates a block diagram showing various components of an illustrative user device 400 at a high level. For discussion purposes, the illustration shows the user device 400 in the form of a wireless computing device, while it will be understood that other computing devices are contemplated as well.

The user device 400 may include one or more antennae 402; a transceiver 404 for cellular, Wi-Fi communication, short-range communication technology, and/or wired communication; a user interface 406; one or more processors 408; hardware 410; and memory 430. In some embodiments, the antennae 402 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 404, sometimes collectively referred to as a network interface, which is configured to receive and transmit digital data. In one embodiment, the user device 400 does not include an antenna 402 and communication with external components is via wired communication.

In one embodiment, the user device 400 includes one or more user interface(s) 406 that enables a user to provide input and receive output from the user device 400. For example, the user interface 406 may include a data output device (e.g., visual display(s), audio speakers, haptic device, etc.) that may be used to provide the destination and/or purpose of each resource that is subject to the permission of the user, with respect to an app. The output device can also be used to solicit from the user whether to restrict resources for particular destinations and/or purposes and provide any alternatives for the user sensitive information.

The user interface(s) 406 may also include one or more data input devices. The data input devices may include, but are not limited to, combinations of one or more of keypads, knobs/controls, keyboards, touch screens, microphones, speech recognition packages, and any other suitable devices or other electronic/software selection interfaces.

The user device 400 may include one or more processors 408, which may be a single-core processor, a multi-core processor, a complex instruction set computing (CISC) processor, gaming processor, or any other type of suitable processor.

The hardware 410 may include a power source and digital signal processors (DSPs), which may include single-core or multiple-core processors. The hardware 410 may also include network processors that manage high-speed communication interfaces, including communication interfaces that interact with peripheral components. The network processors and the peripheral components may be linked by switching fabric. The hardware 410 may include hardware decoders and encoders, a network interface controller, and/or a USB controller.

The hardware 410 may include various sensors to determine the condition of the user device. For example, there may be one or more accelerometers 412 that are configured to measure acceleration forces, which may be used to determine an orientation of the user device 400 and/or whether the user device is in a scenario of a vehicular accident. There may be a gyroscope 414, which allows the measure of the rotation of the user device, as well as lateral movements, which may indicate the activity a user may be involved with.

The hardware 410 may further include a GPS sensor 416 that is operative to provide a location of the user device and its speed. The hardware 410 may include one or more cameras 418 that are operative to take photographs that can be stored in the memory 430 of the user device and/or shared with different recipients based on permission settings.

The user device 400 includes memory 430 that may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 430 may store various software components or modules that are executable or accessible by the processor(s) 408 and controller(s) of the user device 400. The various components of the memory 430 may include software 432 and an operating system 450. The software 432 may include various applications 440, such as a privacy engine 442 having several modules, each configured to control a different aspect the determination of the identification of whether an app is vulnerable to disclose user sensitive information and how to protect the user sensitive information without inducing the app to fail. Each module may include routines, program instructions, objects, and/or data structures that perform tasks or implement abstract data types, discussed in more detail later.

The operating system 450 may include components that enable the user device 400 to receive and transmit data via various interfaces (e.g., user controls, communication interface, and/or memory input/output devices), as well as process data using the processor(s) 408 to generate output. The operating system 450 may include a presentation component that presents the output (e.g., display the data on an electronic display of the user device 400, store the data in memory 430, transmit the data to another electronic device, etc.). Additionally, the operating system 450 may include other components that perform various additional functions generally associated with an operating system 450. By virtue of the hardware and software of the user device 400, the privacy engine 442 is operative to protect user sensitive information that is tailored to the configuration of the user device 400.

Example Process

Figure 5:
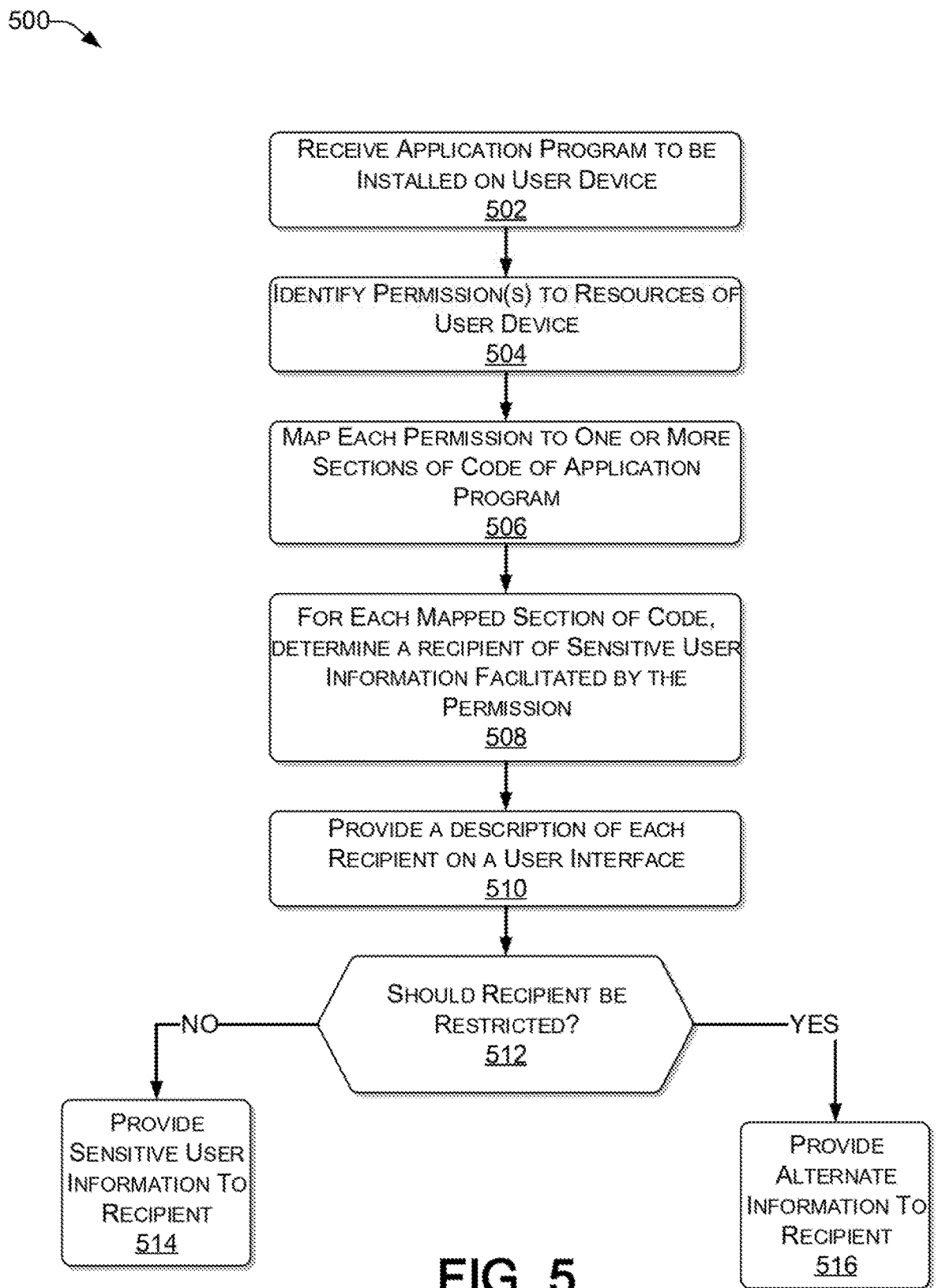
FIG. 5 presents an illustrative process for protecting the sensitive information of a user with respect to an application.

With the foregoing overview of the architecture 100, example static code analysis 200, example user input for a tailored configuration 300, and the components of a user device 400, it may be helpful now to consider a high-level discussion of an example call flow process. To that end, FIG. 5 presents an illustrative process 500 for identifying a vulnerable app and protecting the sensitive information of a user from the app.

Process 500 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 500 is described with reference to the architecture 100 of FIG. 1.

At block 502, the user device receives a program to be installed in a memory of the user device. The application may be received from one or more app stores 110 or directly from an application developer 120.

At block 504, the privacy engine of the user device identifies permissions to resources of the user device that are requested by the application program.

At block 506, for each permission, the privacy engine maps the permission to one or more sections of a code of the application program.

At block 508, for each permission and its corresponding mapped section of the code, the privacy engine determines a recipient of user sensitive information that is facilitated by the permission to the corresponding resource. In some embodiments, a nature or purpose of the recipient of the sensitive information is determined. To that end, the privacy engine may refer to the security database 112, which may administer information related to different sites and the threats that are posed thereby.

At block 510, a description of each recipient is provided on a user interface of the user device. For example, each recipient may be described on a display of the user device.

At block 512, for each recipient, a determination is made whether the recipient should be restricted from the resource(s) for which permission is sought. If the recipient should not be restricted (i.e., "NO" at decision block 512), the process continues with block 514, where the recipient is granted permission to the corresponding resource(s), and the user sensitive information facilitated by the permission to the recipient. However, if it is determined that the recipient should be restricted (i.e., "YES" at decision block 512), the process continues with block 516, where the recipient is blocked access to the corresponding resource. Instead, alternate information is provided to the recipient. In various embodiments, the alternate information may be a default information (e.g., default GPS coordinates), random information (e.g., GPS coordinates randomly selected from another plausible location), information provided by the user through the user device during a prompt from the privacy engine, or information retrieved from the CRM 118.

Example Computer Platform

Figure 6:
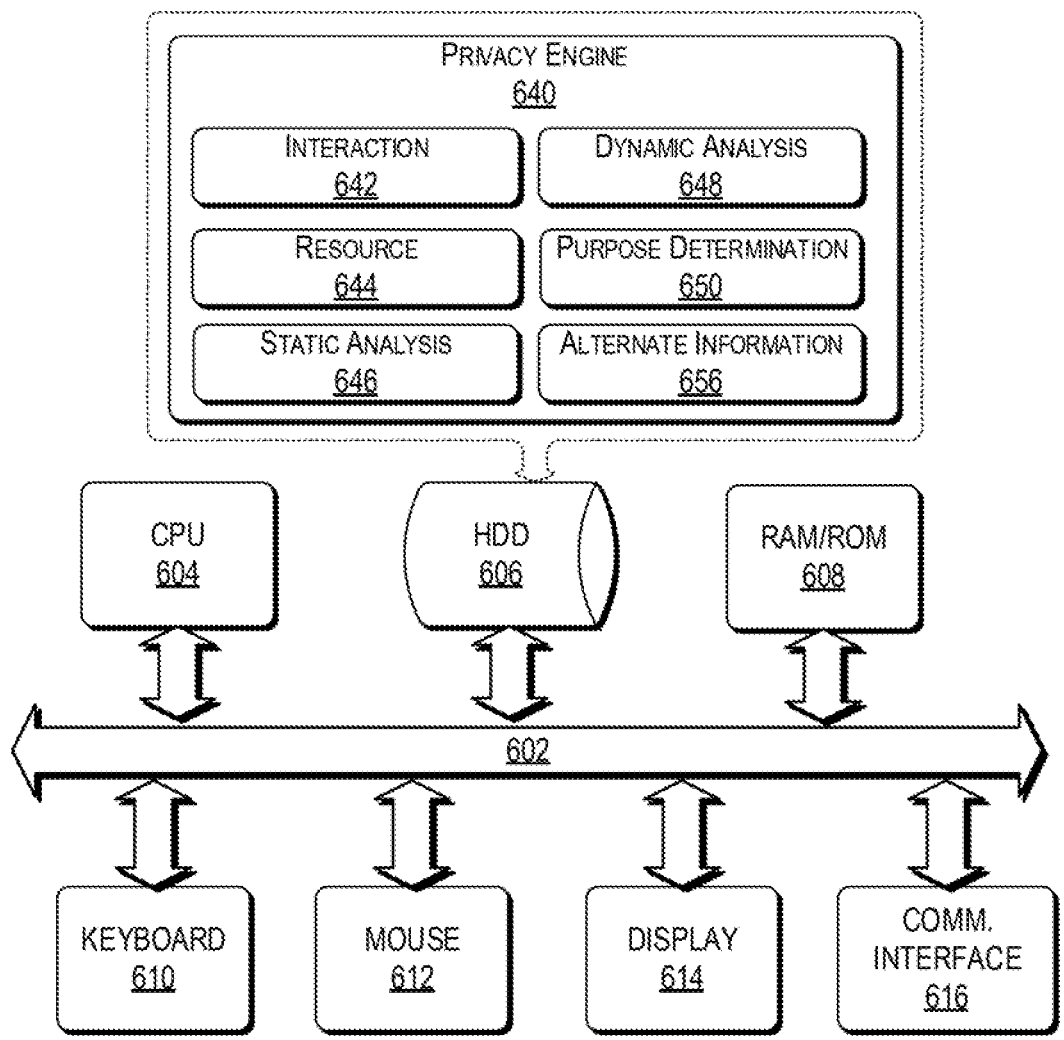
FIG. 6 is a functional block diagram illustration of a computer hardware that can communicate with various networked components.

As discussed above, functions relating to the identification of whether an app is vulnerable to disclose user sensitive information and protection thereof, can be performed with the use of one or more computing devices connected for data communication via wireless or wired communication, as shown in FIG. 1. An example user device 400 in the form of a mobile device was discussed in the context of FIG. 4. FIG. 6 is a functional block diagram illustration of a computer hardware platform such as a user device that can communicate with various networked components, such as various app stores, application developers, etc.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the privacy engine 640, in a manner described herein. The privacy engine 640 may have various modules configured to perform different functions.

For example, there may be an interaction module 642 that is operative to interact with one or more computing devices and databases, such as app store(s) 110, database 1112, application developer(s) 120, and CRM 118.

In one embodiment, there is resource module 644 operative to determine the resources available on a user device. For example, different computer platforms may have different sensors (e.g., multiple camera's, accelerometer's, humidity sensors, etc.), which may affect whether a received app that is soliciting permissions poses a threat to user sensitive information accessed by these resources. Accordingly, the privacy solution provided herein is tailored for each computing platform.

In one embodiment, there is a static analysis module 646 that is operative to perform static analysis of the code of the application being installed on the user device. For example, the static analysis module 646 can map the permissions to one or more sections of the code of the application.

In one embodiment, there is a dynamic analysis module 648 that is operative to perform dynamic analysis of the code of the application that is installed on the user device. For example, the dynamic analysis may be performed in addition to the dynamic analysis.

In one embodiment, there is a purpose determination module 650 that is operative to determine the purpose of the potential recipient of user sensitive information. In one embodiment, the purpose is provided by a database, upon being provided information about the recipient.

In one embodiment, there is an alternate information module 652 that is operative to provide alternate information to a recipient who would like to receive sensitive information from a user device. Instead of providing the user sensitive information, the alternate information module 652 is configured to provide false, default, or user provided information, collectively referred to herein as alternate information, to the recipient. By virtue of providing alternate information (i.e., instead of null data) the app that is harvesting the user sensitive information is facilitated to work without malfunction.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A user device comprising:
    a processor;
    a network interface coupled to the processor to enable communication over a network;
    a user interface coupled to the processor;
    a storage device for content and programming coupled to the processor;
    a privacy engine software stored in the storage device, wherein an execution of the privacy engine software by the processor configures the user device to perform acts comprising:
    receiving an application program to be installed on the user device;
    identifying permissions to resources of the user device for an installation or a first access of the respective resources of the user device by the application program;
    facilitating a functionality of the application program by, for each permission:
        mapping the permission to one or more sections of a code of the application program by static analysis of the code of the application program;
        upon determining, in the static analysis, that a permission of the identified permissions does not have a corresponding section in the code of the application program, identifying the permission as having no present purpose;
        determining, for each mapped section of the code, a recipient of user sensitive information facilitated by the permission;
        for each recipient, determining whether the recipient should be restricted by prompting a user of the user device for a confirmation of the permission; and
        upon determining that the recipient should be restricted, providing alternate information to the recipient.

2. The user device of claim 1, wherein execution of the privacy engine further configures the user device to perform an act comprising, for each permission: displaying each recipient on the user interface of the user device.

3. The user device of claim 2, wherein, for each recipient, determining whether the recipient should be restricted, is based on selections received by the user device in response to displaying the recipient on the user interface of the user device.

4. The user device of claim 1, wherein execution of the privacy engine further configures the user device to perform acts comprising:
- for each mapped section of the code: determining a purpose for the user sensitive information; and
- upon determining that the recipient should not be restricted, providing the user sensitive information facilitated by the permission to the recipient.

5. The user device of claim 4, wherein determining a purpose for the user sensitive information comprises:
- sending an identification of the recipient of the user sensitive information to a security database operative to identify a purpose of the recipient; and
- receiving the purpose of the recipient from the security database.

6. The user device of claim 1, wherein the resources include at least one of:
- a global positioning system (GPS) sensor;
- a camera;
- a gyroscope;
- a microphone;
- a battery status sensor; and
- a humidity sensor.

7. The user device of claim 1, wherein execution of the privacy engine further configures the user device to perform acts comprising:
- for each permission that cannot be mapped onto a section of the code of the application program, flagging the application program with a warning; and
- displaying each warning on the user interface.

8. The user device of claim 1, wherein the alternate information is randomly generated by the privacy engine.

9. The user device of claim 1, wherein the alternate information is received from the user interface of the user device.

10. The user device of claim 1, wherein the alternate information is retrieved from a repository over the network.

11. A non-transitory computer readable storage medium tangibly embodying a computer readable program code having computer readable instructions that, when executed, causes a user device to carry out a method of protecting user sensitive information from an application program, the method comprising:
- receiving the application program to be installed on the user device;
- identifying permissions to resources of the user device for an installation or a first access of the respective resources of the user device by the application program;
- facilitating a functionality of the application program by, for each permission:
  - mapping the permission to one or more sections of a code of the application program by static analysis of the code of the application program;
  - upon determining, in the static analysis, that a permission of the identified permissions does not have a corresponding section in the code of the application program, identifying the permission as having no present purpose;
  - determining, for each mapped section of the code, a recipient of user sensitive information facilitated by the permission;
  - for each recipient, determining whether the recipient should be restricted by prompting a user of the user device for a confirmation of the permission; and
  - upon determining that the recipient should be restricted, providing alternate information to the recipient.

12. The non-transitory computer readable storage medium of claim 11, further comprising, for each permission: displaying each recipient on the user interface of the user device.

13. The non-transitory computer readable storage medium of claim 12, wherein, for each recipient, determining whether the recipient should be restricted, is based on selections received by the user device in response to displaying the recipient on the user interface of the user device.

14. The non-transitory computer readable storage medium of claim 11, further comprising:
- for each mapped section of the code: determining a purpose for the user sensitive information; and
- upon determining that the recipient should not be restricted, providing the user sensitive information facilitated by the permission to the recipient.

15. The non-transitory computer readable storage medium of claim 14, wherein determining a purpose of the user sensitive information comprises:
- sending an identification of the recipient of the user sensitive information to a security database operative to identify a purpose of the recipient; and
- receiving the purpose of the recipient from the security database.

16. The non-transitory computer readable storage medium of claim 11, wherein the resources include at least one of:
- a global positioning system (GPS) sensor;
- a camera;
- a gyroscope;
- a microphone;
- a battery status sensor; and
- a humidity sensor.

17. The non-transitory computer readable storage medium of claim 11, further comprising:
- for each permission that cannot be mapped onto a section of the code of the application program, flagging the application program with a warning; and
- displaying each warning on a user interface of the user device.

18. The non-transitory computer readable storage medium of claim 11, wherein the alternate information is at least one of:
- randomly generated;
- received from a user interface of the user device; and
- retrieved from a repository over a network.

* * * * *